United States Patent
Henriksson (10) Patent No.: US 12,296,376 B2
(45) Date of Patent: May 13, 2025

(54) APPARATUS AND A METHOD FOR MATERIAL FORMING BY IMPACT

(71) Applicant: Cell Impact AB, Karlskoga (SE)

(72) Inventor: Erika Henriksson, Skoghall (SE)

(73) Assignee: CELL IMPACT AB, Karlskoga (SE)

( * ) Notice: Subject to any disclaimer, the term of this patent is extended or adjusted under 35 U.S.C. 154(b) by 146 days.

(21) Appl. No.: 17/906,668

(22) PCT Filed: Mar. 17, 2021

(86) PCT No.: PCT/EP2021/056826
§ 371 (c)(1),
(2) Date: Sep. 19, 2022

(87) PCT Pub. No.: WO2021/197853
PCT Pub. Date: Oct. 7, 2021

(65) Prior Publication Data
US 2023/0356286 A1    Nov. 9, 2023

(30) Foreign Application Priority Data
Apr. 2, 2020   (SE) .................................... 2050376-9

(51) Int. Cl.
*B21J 7/28*   (2006.01)
*B21J 5/00*   (2006.01)
*B21J 13/04*  (2006.01)

(52) U.S. Cl.
CPC . *B21J 7/28* (2013.01); *B21J 5/00* (2013.01); *B21J 13/04* (2013.01)

(58) Field of Classification Search
CPC ....... B21J 7/02; B21J 70/04; B21J 7/20; B21J 7/22; B21J 7/28; B21J 5/00; B21J 5/02;
(Continued)

(56) References Cited

U.S. PATENT DOCUMENTS 3,205,790 A   9/1965   Bollar
3,222,914 A   12/1965  Monahan
(Continued)

FOREIGN PATENT DOCUMENTS

CA   2323943 A1   4/2001
CN   1462214 A    12/2003
(Continued)

OTHER PUBLICATIONS

Search Report Issued by the Chinese Patent Office issued on Mar. 5, 2024, 3 pages.
Search report for parent PCT/EP2021/056826 mailed Jun. 21, 2021.

*Primary Examiner* — Teresa M Ekiert
(74) *Attorney, Agent, or Firm* — Schott, PC.

(57) ABSTRACT

The invention relates to an apparatus for material forming, by means of a tool (41) and a drive unit (2), the apparatus being arranged to move the drive unit (2) to provide kinetic energy to the tool (41), for the tool (41) to strike a work material (W), so as to form the work material (W), the apparatus being provided with an impact head (4") between the drive unit (2) and the tool (41), and the apparatus being arranged to provide the kinetic energy to the tool by the drive unit (2) striking the impact head (4"), wherein at least a region of the impact head (4") is allowed to move in relation to the tool (41) laterally to a direction of the stroke of the drive unit, whereby the impact head is arranged to expand laterally in relation to the tool. The invention also relates to a method for material forming.

19 Claims, 6 Drawing Sheets

(58) Field of Classification Search
CPC .. B21J 13/02; B21J 13/03; B21J 13/04; B30B 15/0076; B30B 15/065
See application file for complete search history.

(56) References Cited

U.S. PATENT DOCUMENTS

| | | | | |
|---|---|---|---|---|
| 4,222,260 | A | * | 9/1980 | McDermott ............ B21J 13/02 72/352 |
| 4,718,263 | A | * | 1/1988 | Crout ..................... B21J 7/46 700/145 |
| 5,832,807 | A | * | 11/1998 | Rausch ................. B23D 15/14 60/494 |
| 2002/0040798 | A1 | | 4/2002 | Intonen et al. |
| 2004/0134254 | A1 | * | 7/2004 | Dahlberg ................. B21J 7/28 72/435 |
| 2017/0136522 | A1 | | 5/2017 | Ivarson et al. |

FOREIGN PATENT DOCUMENTS

| | | | |
|---|---|---|---|
| CN | 10191109 | A | 12/2007 |
| CN | 103302215 | A | 9/2013 |
| CN | 210146898 | U | 3/2020 |
| DE | 102006017640 | A1 | 10/2007 |
| SE | 0101623 | L | 11/2002 |
| SE | 530280 | C2 | 4/2008 |
| WO | 2015152790 | A1 | 10/2015 |
| WO | 2020064934 | A2 | 4/2020 |

* cited by examiner

APPARATUS AND A METHOD FOR MATERIAL FORMING BY IMPACT

TECHNICAL FIELD

The invention relates to an apparatus for material forming, by means of a tool and a drive unit, the apparatus being arranged to move the drive unit to provide kinetic energy to the tool, for the tool to strike a work material, so as to form the work material, the apparatus being provided with an impact head between the drive unit and the tool, and the apparatus being arranged to provide the kinetic energy to the tool by the drive unit striking the impact head.

BACKGROUND

The invention is advantageously used for High velocity forming (HVF). However, the invention may according to other embodiments of the invention be used for material forming involving other velocities than used for HVF. HVF is herein also referred to as High velocity material forming. HVF of metals is also known as High velocity metal forming.

In conventional metal forming operations, a force is applied to the metal to be worked upon, by using simple hammer blow or a power press; the heavy tools used are moved at a relatively low velocity. Conventional techniques include methods such as forging, extrusion, drawing, and punching, etc. Among other technologies, there are also welding/burning technologies, such as burning by laser, oxy-fuel burning, and plasma.

Examples of HVF are given in EP312249161. HVF involves imparting a high kinetic energy to a tool, by giving it a high velocity, before it is made to hit a work piece. HVF includes methods such as hydraulic forming, explosive forming, electro hydraulic forming, and electromagnetic forming, for example by means of an electric motor. In these forming processes a large amount of energy is applied to the work piece during a very short interval of time. The velocities of HVF may typically be at least 1 m/s, preferably at least 3 m/s, preferably at least 5 m/s. For example, the velocities of HVF may be 1-20 m/s, preferably, 3-15 m/s, preferably 5-15 m/s. HVF may be regarded as a process in which the material shaping forces are obtained from kinetic energy, whereas, in conventional material forming, the material forming forces are obtained from pressure, e.g. hydraulic pressure.

An advantage of HVF is provided by the fact that many metals tend to deform more readily under a very fast application of a load. The strain distribution is much more uniform in a single operation of HVF as compared to conventional forming techniques. This results in making it easy to produce complex shapes without inducing unnecessary strains in the material. This allows forming of complex parts with close tolerances. This also allows forming of alloys that might not be formable by conventional metal forming. For example, HVF may be used in the manufacturing of metal flow plates used in fuel cells. Such manufacturing requires small tolerances.

Another advantage with HVF is that, while the kinetic energy of a tool is linearly proportional to the mass of the tool, it is squarely proportional to the velocity of the tool, and therefore, compared to conventional metal forming, considerably lighter tools may be used in HVF.

It is known in HVF to provide an impact head between the plunger and the tool. At repeated work cycles of the apparatus, the impact head may heat up due to deformations at the stokes. Thereby, the material of the impact head may expand, leading to a deformation of the impact head. With such a deformation, the impact head may interfere with other parts of the apparatus, such as the tool, and/or a tool holder of the apparatus. This may reduce the lifetime of the apparatus. Also, if the tool is deformed, the accuracy of the tool to work material stroke may be reduced. Thereby, the quality of products produced by the apparatus may be reduced.

SUMMARY

An object of the invention is to increase the lifetime of the parts included in an apparatus for material forming, preferably in high velocity forming. It is also an object of the invention to increase the quality of products produced by an apparatus for material forming, preferably in high velocity forming.

The objects are reached with an apparatus according to claim 1. Thus, the invention provides an apparatus for material forming, by means of a tool and a drive unit. The apparatus is arranged to move the drive unit to provide kinetic energy to the tool, for the tool to strike a work material, so as to form the work material. The apparatus is provided with an impact head between the drive unit and the tool. The apparatus is arranged to provide the kinetic energy to the tool by the drive unit striking the impact head. At least a region of the impact head is allowed to move in relation to the tool laterally to a direction of the stroke of the drive unit. Thereby, the impact head is arranged to expand, laterally to the direction of the stroke of the drive unit, in relation to the tool.

The drive unit may be arranged to move downwardly. The impact head may transfer kinetic energy to the tool. The tool may be movable. The impact head may be arranged to be in contact with the tool. The impact head may rest on the tool. The entire impact head, or at least a region thereof, may be allowed to move laterally in relation to the tool. Such a region may be a peripheral region of the impact head. In some embodiments, a portion of the impact head may be prevented to move laterally in relation to the tool. Such a portion may be located centrally, or close to the periphery of the impact head. Thereby, the region of the impact head outside of such a laterally restrained portion may be allowed to move laterally in relation to the tool.

Thus, the apparatus is preferably arranged so as for the at least a region of the impact head to be allowed to move in relation to the tool laterally to the direction of the stroke of the drive unit. The region of the impact head which is allowed to move in relation to the tool may form one or more surfaces which is/are arranged to be in contact with the tool. The lateral movement between the impact head and the tool may be allowed by one or more surfaces of the impact head being allowed to slide on one or more surfaces of the tool. Such surfaces may be planar and perpendicular to the direction of the stroke of the drive unit.

Thus, an expansion of the impact head in relation to the tool may be an expansion of the impact head independently of the tool. The impact head being arranged to expand laterally to the stroke direction independently of the tool, allows for a temperature expansion of the impact head, e.g. caused by repeated work cycles of the apparatus, without deforming the tool. Thereby, the impact head may affect the tool merely in the stroke direction. In particular, a lateral deformation of the tool, caused by a lateral impact head deformation, may be avoided or minimized. Thereby, a reduction of the apparatus product quality due to tool deformations may be avoided or minimized.

Moving the drive unit may comprise accelerating the drive unit. Providing kinetic energy to the impact head and the tool may be done in different ways. For example, the drive unit may strike the impact head. Thereby, the impact head and the tool may be at rest before the strike, while the drive unit approaches the impact head.

The impact head may be in contact with the tool before the strike, while the drive unit approaches the impact head. The impact head may be arranged above the tool. Thereby, the impact head may rest on the tool. Thereby, the drive unit may be moved downwards to strike the impact head.

In some embodiments, wherein moving the drive unit comprises accelerating the drive unit, the drive unit is a plunger arranged to be driven by a hydraulic system. The plunger may be movably arranged in a cylinder housing. The cylinder housing may be mounted to a frame. In alternative embodiments, the drive unit may be arranged to be driven in some alternative manner, for example by explosives, by electromagnetism, or by pneumatics.

The energy of the tool may be adjusted by adjusting the velocity and/or mass of the tool. It is understood that a second tool may be present on the opposite side of the work material. The work material may be a workpiece, such as a solid piece of material, e.g. in the form of a sheet, for example in metal. The work material may alternatively be a material in some other form, e.g. powder form.

Preferably, the drive unit moves, upon the impact with the impact head, away from the work material. The movement of the drive unit, upon the impact with the impact head, may be secured by an appropriate selection of the mass of the drive unit, the mass of the impact head, the mass of the tool, and the driving force acting on the drive unit at the time of impact with the impact head. This provides for avoiding that the impact head contacts the drive unit during a return movement of the impact head and the tool.

Although many of the examples herein relate to high velocity forming, embodiments of the invention may also be used for other types of material forming.

The apparatus may comprise a frame, Thereby, the apparatus may comprise one or more first elastic elements arranged between the frame and the impact head so as to bias the impact head towards the work material, wherein the apparatus comprises one or more second elastic elements arranged between the frame and the tool so as to bias the tool away from the work material.

The first and second elastic elements may form an elastic arrangement. In some embodiments, the drive unit is arranged mounted to the frame. The frame may be stationary. The frame may comprise a tool housing. The impact head and the tool may be provided in the tool housing. The frame, e.g. the tool housing thereof, may be arranged to hold the impact head and the tool. The impact head and the tool may be arranged to be movable in relation to a frame. The elastic arrangement may be mounted to the frame. In some embodiments, the elastic arrangement may be mounted to the impact head and the tool. The frame may be arranged to receive the work material. The frame, e.g. the tool housing thereof, may be arranged to guide the tool at a strike of the work material. The impact head and the tool may be arranged to be dampened by means of the elastic arrangement.

Preferably, the return movements of the impact head and the tool are dampened by means of the elastic arrangement. Preferably, the elastic arrangement is arranged to dampen the return movement by dissipation of at least a portion of the kinetic energy of the impact head and the tool during the return movement. Preferably, the elastic arrangement is arranged to dampen the return movement by transforming, at least a portion of the kinetic energy of the impact head and the tool, into heat.

The one or more first elastic elements may be arranged between the frame, e.g. the tool housing thereof, and a surface of the impact head facing away from the work material. Thereby the one or more first elastic elements may dampen the return movement of the impact head and the tool. The one or more first elastic elements may be mounted to the frame. The one or more first elastic elements may be mounted to the tool housing. Alternatively, the one or more first elastic elements may be mounted to the impact head.

Preferably, the frame, e.g. the tool housing thereof, comprises a shoulder. The impact head and the tool may present together a foot portion, provided laterally, in relation to the direction of the strike of the work material, outside a surface of the tool, arranged to contact the work material when the work material is struck. As exemplified below, the foot portion may be formed by respective collars of the impact head and the tool. The shoulder of the tool housing may be arranged to extend over a surface of the foot portion facing away from the work material.

Preferably, the one or more second elastic elements are arranged between the frame, e.g. the tool housing thereof, and a surface of the tool facing towards the work material. The one or more second elastic elements may be mounted to the frame. The one or more second elastic elements may be mounted to the tool housing. Alternatively, the one or more second elastic elements may be mounted to the tool.

The one or more second elastic elements may serve as a spring. The one or more second elastic elements may be arranged to accumulate elastic energy during the movement of the impact head and the tool towards the work material, before the work material is struck. After the strike, the elastic energy may be released so as to urge the impact head and the tool away from the work material. Thereby, the one or more first elastic elements may serve to dampen the resulting return movement of the impact head and the tool. It should be noted that the one or more second elastic elements may also be arranged to dampen the movement towards the work material, by dissipation of a portion of the kinetic energy of the impact head and the tool during the movement towards the work material.

Preferably, the impact head and the tool are held together, in the direction of the stroke of the drive unit, by the first and second elastic elements. Thereby, the impact head and the tool may be biased against each other only by the first and second elastic elements. The elastic elements may hold tool and impact head together. Thereby, the first and second elastic elements may prevent a separation of the impact head and the tool, in the stroke direction. Thereby, energy losses caused by such a separation may be avoided. There may be no further connection preventing separation, e.g. in the stroke direction, of the impact head and the tool. Thereby, the separation in the stroke direction may be avoided, while the impact head is allowed to expand laterally to the stroke direction, in relation to the tool.

In some embodiments the impact head and the tool may be restrained between the elastic elements. The impact head and the tool may be arranged in restrained engagement between the elastic elements. Thereby, the elastic elements may be arranged to accumulate elastic energy so as to create counteracting spring forces acting on the impact head and the tool. Thereby, the impact head and the tool may be squeezed in between the first and second elastic elements.

Thereby any play between the tool housing and the impact head and the tool may be reduced or eliminated.

Thereby, separation of the impact head and the tool may be avoided, while the impact head is allowed to expand laterally in relation to the tool. Also, the movements of the impact head and the tool may be controlled so as to reduce or eliminate any undesired movement of the impact head and the tool, for example a movement causing a second collision with the drive unit or the work material, a lateral movement, or a rotational movement. Preferably, contact is kept between the impact head, the tool, and the frame, via the elastic elements, throughout the entire process of striking the work material. Said process may be considered as extending in time, from a status of rest of the impact head and the tool, through the strike of the work material, and up to a time when the impact head and the tool are again at rest.

It should be noted that in some embodiments, a separation of the impact head and the tool, in the stroke direction, may be allowed. For example, where the impact head and the tool are restrained between elastic elements, as exemplified above, before the drive unit strikes the impact head, the impact head and the tool may be in contact with each other. However, the contact between the impact head and the tool may be temporarily lost during a portion of the process of striking the work material. Such a separation may occur upon the drive unit striking the impact head, causing the tool to lose contact with the impact head. By means of the elastic elements, the contact between the impact head and the tool may be reestablished thereafter. This reestablished contact may occur before or after the tool has stricken the work material.

Preferably, the impact head and the tool comprise a respective collar at an interface between the impact head and the tool, wherein the collars are arranged in a recess of the frame. One or more first elastic elements may be arranged between one or more surfaces of the impact head collar, facing away from the work material, and one or more surfaces in the recess. Thereby, the one or more elastic elements may be arranged between a surface of the impact head collar, facing away from the work material, and a shoulder of a frame, e.g. a tool housing thereof. One or more second elastic elements may be arranged between one or more surfaces of the tool collar, facing away from the impact head, and one or more surfaces in the recess, wherein the collars are arranged to be restrained between the elastic elements. Thereby, the one or more second elastic elements may be arranged between a surface of the tool collar, facing away from the impact head, and a shoulder of a frame, e.g. a tool housing thereof. The collars may be arranged to be restrained between the elastic elements.

The collars may form what is herein referred to as a foot portion of the impact head and the tool. The collar of the tool may surround, as seen in the direction of the stroke of the drive unit, a working surface of the tool which is arranged to come into contact with the work material at the stroke.

The one or more first elastic elements may be provided with a lower hardness than the one or more second elastic elements. Thereby, when the impact head and the tool are restrained between the first and second elastic elements, the one or more first elements may be more compressed that the one or more second elements. Thereby, it may be secured that there is no contact between the tool and the work material, when the impact head and the tool are at rest. Preferably, the compression of the one or more first elements, when the impact head and the tool are at rest, is larger than the distance from the respective rest positions, of the impact head and the tool, to the respective positions that the impact head and the tool have at the strike of the work material. Thereby, it may be secured that the first and second elastic elements remain in contact with the impact head, the tool, and with the frame, during the entire striking process. For example, if the movement from the rest position to the striking position is a certain distance, e.g. 2.0 mm, then the compression of the first elastic element, at the rest position, is larger than that certain distance, e.g. larger than 2.0 mm.

Preferably, the impact head is, in a plane perpendicular to the direction of the stroke of the drive unit, surrounded by the frame. Thereby, where the impact head is, as seen in the stroke direction, positioned centrally in relation to the frame, there is preferably in said plane a distance between the impact head and the frame. Said distance may be 0.1-3.0 mm. Thereby, it may be secured that the impact tool is allowed expand laterally to the stroke direction. The impact head may be compressed at the stroke by the drive unit. By said distance to the frame, an expansion of the impact head, laterally to the stroke direction, caused by said compression, may be allowed. Thereby, a contact between the impact head and the frame may be avoided. Thereby, an energy loss caused by such a contact may be avoided.

Preferably, at least a peripheral region of the impact head is allowed to move laterally in relation to the tool. In some embodiments, the impact head is arranged to be allowed to move, in relation to the tool, perpendicularly to the direction of the stroke of the drive unit. Thereby, the entire the impact head may be allowed to move, in relation to the tool, perpendicularly to the direction of the stroke of the drive unit. Thereby, there may be no restriction preventing lateral movements of impact head relative to tool.

In some embodiments, any respective surface of the impact head and the tool, arranged to be in contact with the other of the impact head and the tool, are planar and perpendicular to the direction of the stroke of the drive unit. Thereby, the entire the impact head may be allowed to move, in relation to the tool, perpendicularly to the direction of the stroke of the drive unit.

However, in some embodiments, there may be, centrally in the stroke direction, a lateral restriction between the impact head and the tool. Thereby, a peripheral region of the impact head may be laterally unrestricted in relation to the tool. Thereby, the peripheral region of the impact head may be allowed to move laterally in relation to the tool.

More generally, there may be, or there may not be, a lateral restriction between the impact head and the tool. In embodiments, where such a lateral restriction is provided, any respective surface of the impact head and the tool, laterally separated from the lateral restriction, and arranged to be in contact with the other of the impact head and the tool, are preferably planar and perpendicular to the direction of the stroke of the drive unit. Thereby, a region of the impact head, which region is laterally separated from the lateral restriction, e.g. a peripheral region of the impact head, may be allowed to move laterally in relation to the tool. Thereby, the impact head is arranged to expand, laterally to a direction of the stroke of the drive unit, in relation to the tool.

Preferably, movements by the impact head, laterally to the direction of the stroke of the drive unit, are limited by the frame. Thereby, distances, laterally to the direction of the stroke of the drive unit, between the impact head and the frame may be such that the impact head is allowed to move laterally to the stroke direction. Thereby, said allowed movement of the impact head may be 0.2-6.0 mm. The frame may circumvent the impact head. A shoulder of the frame may circumvent the impact head.

Preferably, movements by the tool, laterally to the direction of the stroke of the drive unit, are limited by the frame. Thereby, distances laterally to the stroke direction between the impact head and the frame, and distances laterally to the stroke direction between the tool and the frame, may be such that the impact head is allowed to move laterally more than the tool. The frame may be arranged to guide the tool along the stroke direction. The guiding of the tool allows an accurate positioning of the tool onto the work material. Thereby, the fit of the tool in the frame may be such that unrestricted movement of the tool along the stroke direction is allowed. Thereby, a minimal lateral movement of the tool in relation to the frame may be allowed. Thus, a tight lateral fit between the frame and the tool may be provided.

As suggested, the impact head being arranged to expand laterally independently of the tool, allows for a temperature expansion of the impact head, without affecting the tool. In particular, a deformation of the tool, caused by an impact head deformation, may be avoided or minimized. Thereby, the guiding of the tool, by the frame, along the stroke direction may be unaffected by the impact head deformation.

In some embodiments, one or more pins, fixed to the tool and/or the frame, may be provided for guiding the tool along the frame. Also, in such embodiments, since the impact head being is arranged to expand laterally independently of the tool, the guiding of the tool, by the frame, along the stroke direction may be unaffected by the impact head deformation.

In preferred embodiments, the direction of the stroke of the drive unit is vertical. Thereby, the stroke direction may be pointing downwards. However, in some embodiments, the stroke direction may be pointing upwards.

Said one or more first elastic elements may have additional benefits. The apparatus may be arranged so as for a return movement of the movable impact head and the tool, away from the work material, to be dampened, after the strike of the work material by the tool. This dampening may be provided by said one or more first elastic elements. Where the apparatus is arranged so as for the movable impact head and the tool to be dampened, the apparatus may be arranged to prevent bouncing of the movable impact head and at the tool at their return movements. Preferably, the dampening of the impact head and the tool involves dissipating at least a portion of the kinetic energy of the impact head and the tool return movement. Preferably, the dampening of the impact head and the tool involves transforming, at least a portion of the kinetic energy of the impact head and the tool return movement, into heat. The damping may be proportional to the velocity of the impact head and the tool. Thereby, the impact head and the tool may be dampened as it approaches the drive unit. The risk for rebound is decreased or prevented since the impact head and tool movements are dampened. This improves the properties of the end product, avoiding problems with weakening and unevenness, as well as decreasing the risk for failure in the production. Further, the risk of the impact head colliding, after the stroke of the work material, with another part of the apparatus, such as the drive unit, or a tool holder, is reduced. This improves the lifetime of the parts included in the apparatus for material forming, preferably in high velocity forming. The invention may however also be used for other types of material forming.

In some embodiments, the impact head may have an advantageous form. The impact head may extend in the direction of the stroke from an impact end to a base region, where the base region is closer to the tool than the impact end, wherein the impact head is arranged so that the impact end has laterally, in relation to the direction of the stroke, a smaller extension than the base region. Thereby, an increased lateral extension from the impact end to the base region may be provided. Thereby, the energy from a strike of the drive unit on the impact end of the impact head may be distributed outwardly in a direct manner. Thereby, the kinetic energy may be distributed in a direct manner over a working surface of the tool, intended to contact the work material. Compared to a solution where the energy is distributed more centrally, and then outwardly, this is advantageous. It will reduce any deformation of the tool due to the kinetic energy being distributed with some delay to some parts of the tool. Thus, a simultaneous transfer of kinetic energy to all parts of the impact head may be accomplished. This improves the properties of the end product, avoiding problems with weakening and unevenness, as well as decreases the risk for failure in the production. Also, by reducing deformation of the tool, thereby reducing fatigue, the lifetime of the parts included in the apparatus for material forming is improved.

It should be noted that the impact end may be arranged to be in contact with the drive unit, e.g. at an impact of the drive unit to the impact head. The base region may be at a distance from an interface of the impact head with the tool. Thereby, the base region may be located between the impact end and the interface. However, in some embodiments, the base region may be at the interface. A portion of the impact head extending from the impact end to the base region is herein also referred to as a first portion of the impact head.

Preferably, the apparatus is arranged so as for perimeter edges of the base region of the impact head to be, in the stroke direction, outside of, and/or substantially coinciding with, perimeter edges of a working surface of the tool which is arranged to come into contact with the work material at the stroke. Suitably, the impact head narrows off in the direction away from the tool, and the apparatus is arranged so as for the impact head to transfer kinetic energy towards the perimeter edges of the tool by a stroke of the drive unit to the impact head. Preferably, the impact head is tapered in a direction away from the tool, and the apparatus is arranged so as for the impact head to spread kinetic energy over the tool from the impact end to the base region. Thereby, the impact head may spread kinetic energy evenly to the tool from the impact end to the base region.

In some embodiments, the impact end may present a circular impact surface for the drive unit. Thereby, the impact surface may be adapted to receive a strike from a cylindrical piston of the drive unit. The diameter of the impact surface may the substantially the same as the diameter of the piston. Thereby, a uniform transfer of kinetic energy to the impact head may be accomplished. The base region may have any suitable shape. For example, the base region may be rectangular, or circular, in a plane which is transverse to the direction of the strike of the work material. Thus, in some embodiments, the impact head may present a gradual change of cross-sectional shape from the impact end to the base region, e.g. from a circular shape to a rectangular shape.

As suggested, the impact head and the tool may comprise a respective collar at an interface between the impact head and the tool. The collar of the tool may surround, as seen in the direction of the stroke, a working surface of the tool which is arranged to come into contact with the work material at the stroke. A first portion of the impact head may extend from the collar of the impact head, to the impact end of the impact head, wherein the first portion presents a perimeter edge at the collar, which, as seen in the direction of the stroke, substantially coincides with the working surface. The first portion may be arranged so that the first portion has laterally, in relation to the direction of the stroke, a smaller extension at the impact end than at the impact head collar. The collars may be arranged in a recess of a frame, e.g. a tool housing thereof.

The perimeter edge, at the collar, coinciding with the working surface, allows kinetic energy to be distributed directly and evenly over the entire work surface. This reduces deformations of the work surface. This improves the quality of the result of the process.

As suggested, one or more first elastic elements may be arranged between a surface of the impact head collar, facing away from the work material, and a shoulder of a frame, e.g. a tool housing thereof. One or more second elastic elements may be arranged between a surface of the tool collar, facing away from the impact head, and a shoulder of a frame, e.g. a tool housing thereof. The collars may be restrained between the elastic elements. Thereby, the collars may serve the dual purpose of providing for holding together the impact head and the tool, e.g. by means of the elastic elements, and providing a controlled movement of the impact head and the tool.

Further advantages and advantageous features of the invention are disclosed in the following description and in the dependent claims.

BRIEF DESCRIPTION OF THE DRAWINGS

Below, embodiments of the invention will be described with reference to the drawings, in which.

DETAILED DESCRIPTION OF EMBODIMENTS OF THE INVENTION

Figure 1:
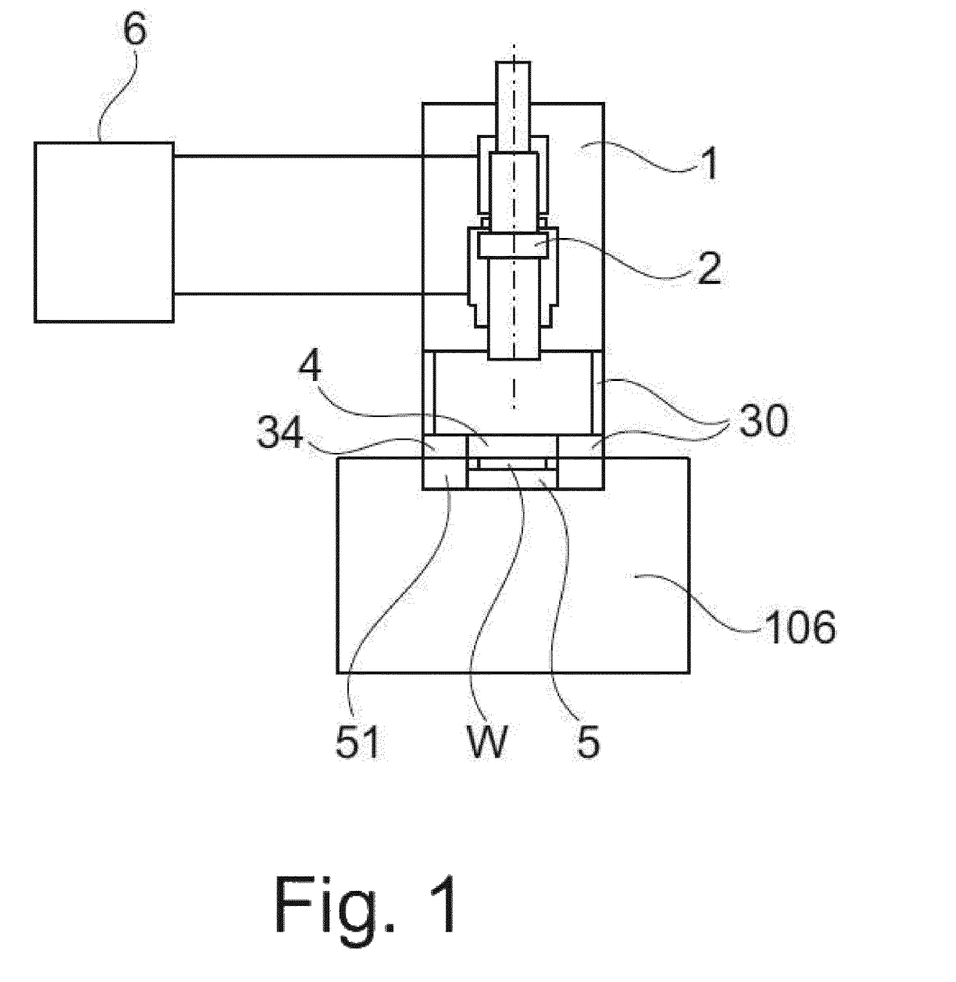
FIG. 1 shows a partially sectioned, schematic view of an apparatus for material forming according to an embodiment of the invention.

FIG. 1 shows an apparatus for material forming according to an embodiment of the invention. In embodiments of the invention, the apparatus comprises a tool housing holding a movable tool to strike the work material W. The apparatus further comprises an impact head. The combination of the impact head and the tool is herein referred to as an impact head and tool combination 4. The tool and the impact head are described closer below.

The tool housing may form a part of a frame 30. The apparatus further comprises a drive unit in the form of a plunger 2, as shown in FIG. 1. In the embodiment shown in FIG. 1, a drive assembly comprises a cylinder housing 1. Further, the drive assembly comprises the plunger 2, that is arranged in the cylinder housing 1. The cylinder housing 1 may be mounted to the frame 30.

Figure 2:
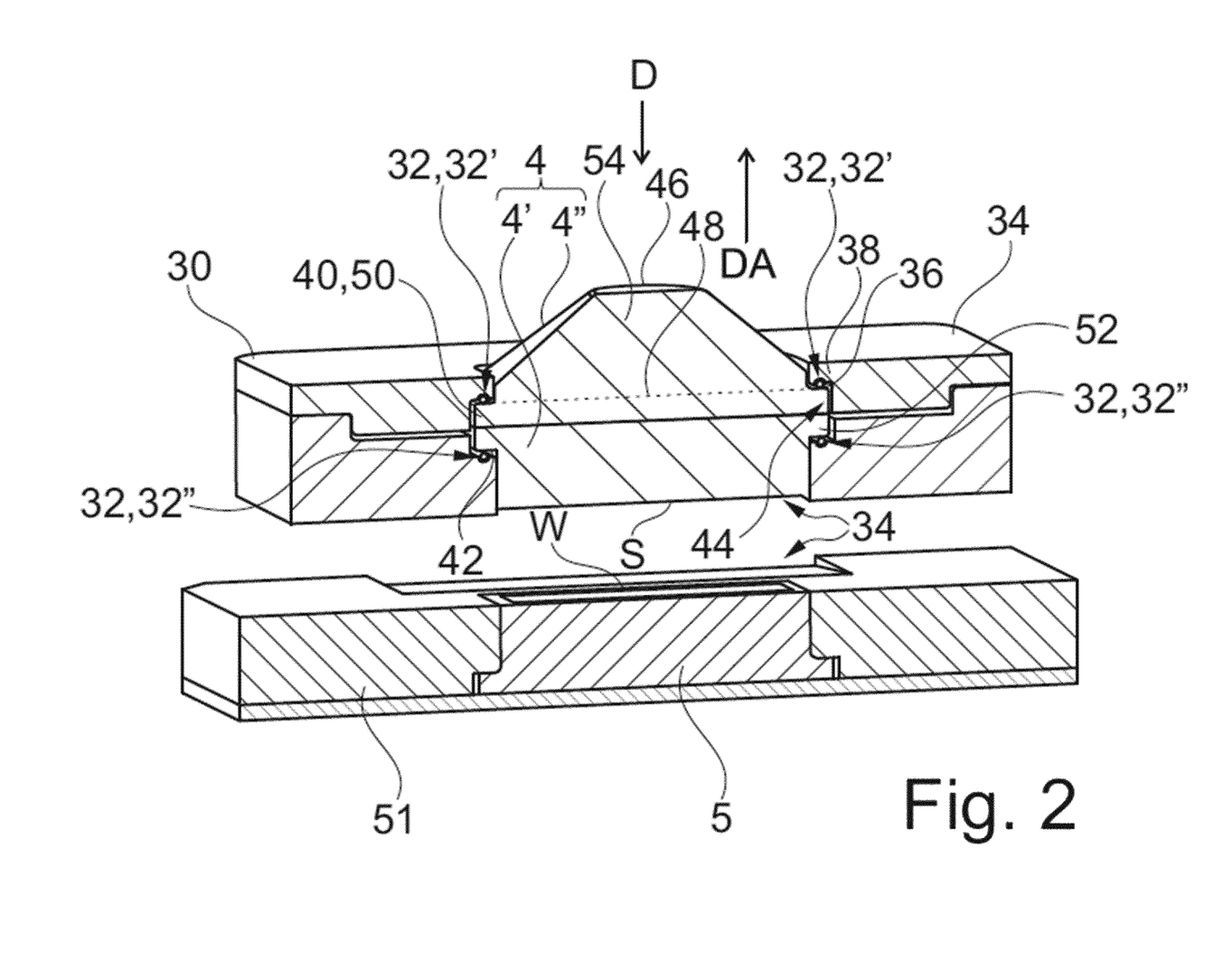
FIG. 2 shows schematically a vertically sectioned perspective view of a part of the apparatus in FIG. 1.

An anvil 106 is fixed to the frame. A fixed tool 5 is mounted to the anvil 106. The fixed tool is mounted to an upper side of the anvil 106. The movable impact head and tool combination 4, described closer below with reference to FIG. 2, is located above the fixed tool 5. The tools 4, 5 present complementary surfaces facing each other. A work material W is removably mounted to the fixed tool 5. The work material W may be mounted to the fixed tool 5 in any suitable manner, e.g. by clamping, or with vacuum. The work material W could be of a variety of types, for example a piece of sheet metal. It should be noted that in some embodiments, what is herein referred to as a fixed tool could also be movable.

The plunger 2 is arranged to move towards and away from the fixed tool 5, as described closer below. The plunger 2 is arranged to be driven by a hydraulic system 6. With respect to the plunger 2, driven by a hydraulic system pressure, reference is made to the disclosure of EP3122491B1, which is hereby incorporated by reference.

The apparatus is arranged to move the plunger 2 to provide kinetic energy to the movable impact head and tool combination 4, for the movable impact head and tool combination 4 to strike a work material, so as to form the work material W.

Before providing kinetic energy to the movable impact head and tool combination 4 by moving or accelerating the plunger 2 to strike the movable impact head and tool combination 4, the movable impact head and tool combination 4 may be positioned at any suitable distance from the work material W. As an example, the distance may be 1.0-10.0 mm, e.g. 1.5-5.0 mm, or 2.0-3.0 mm.

The apparatus is arranged so as for a return movement of the movable impact head and tool combination 4, away from the work material W, to be dampened, after the strike of the work material W by the movable impact head and tool combination 4. Where the apparatus is arranged so as for the movable impact head and tool combination 4 to be dampened, the apparatus may be arranged to prevent bouncing of the movable impact head and tool combination 4 its return movement.

FIG. 2 shows schematically the movable impact head and tool combination 4, and surrounding parts, of the apparatus in FIG. 1. The frame 30 may comprise a tool housing 34. The fixed tool 5 is provided in a tool support 51.

FIG. 2 shows, for the sake of this presentation, the tool housing 34 is presented as separated from the tool support 51. However, when the apparatus is in use, the tool housing 34 would be in contact with the tool support 51. Thus, in FIG. 2 depicts the impact head and tool combination 4 at a distance from the fixed tool 5. Thus, in FIG. 2, the impact head and tool combination 4 is illustrated as being positioned at a significant distance from the work material W. However, for striking the work material, the impact head and tool combination 4 is in this example positioned much closer towards the work material W. Nevertheless, for changing the work material, the tool housing 34 may be separated from the tool support 51, e.g. as depicted in FIG. 2. For example, this separation may be assisted by a guiding arrangement, arranged to guide the movement of the tool housing.

Figure 3:
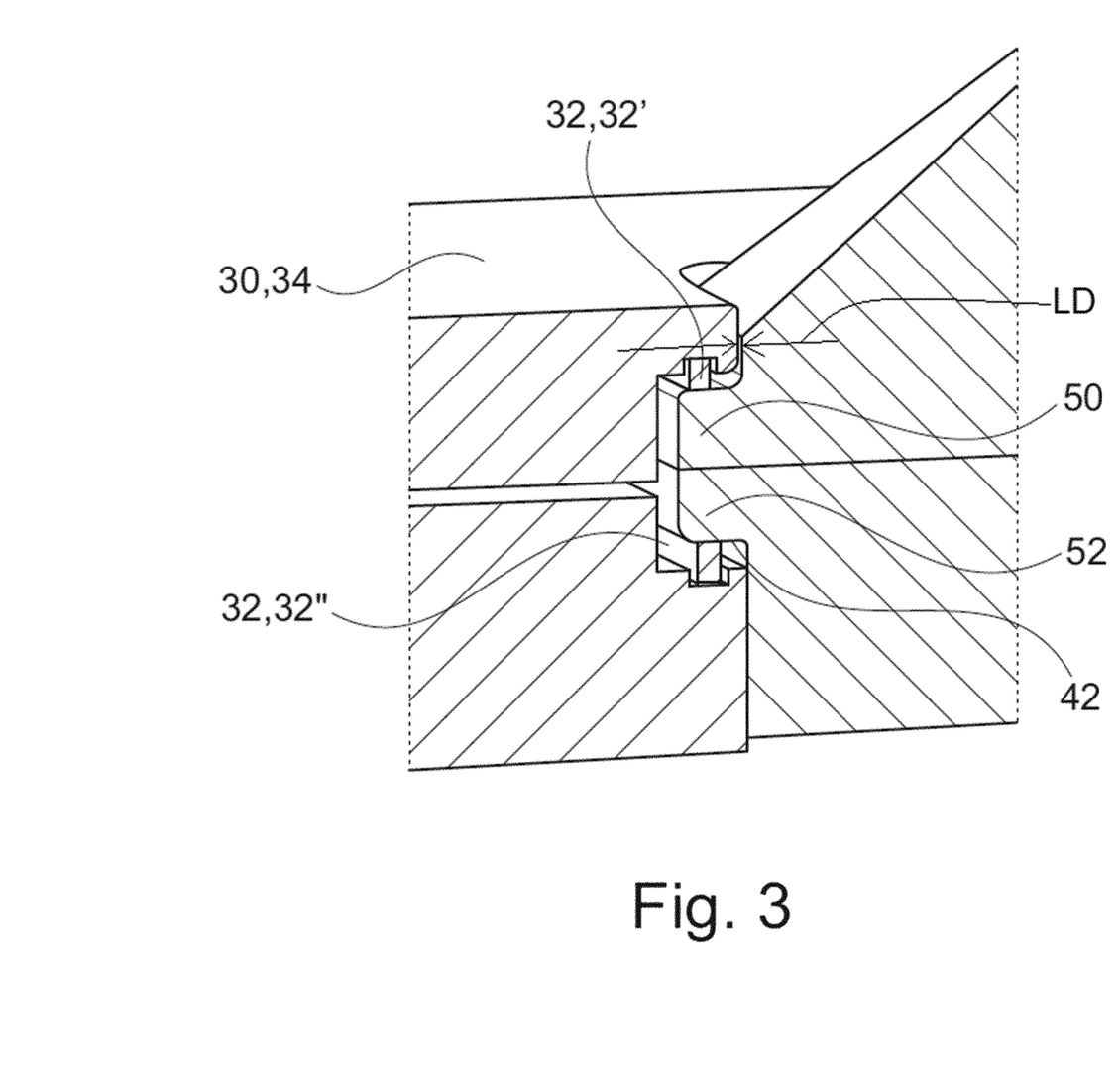
FIG. 3 shows a part of FIG. 2 in greater detail.

Reference is made also to FIG. 3. An elastic arrangement 32 may be mounted to the frame 30, in this example to the tool housing 34. The impact head and tool combination 4 may be arranged to be dampened by means of the elastic arrangement 32. The elastic arrangement 32 may comprise a first elastic element 32' arranged between the tool housing 34 and a surface 36 of the impact head and tool combination 4 facing away from the work material W. The tool housing 34 may be provided with a shoulder 38. The impact head and tool combination 4 can be provided with a foot portion 40, provided laterally, in relation to a direction of the strike D of the work material, outside a surface S, of the impact head and tool combination 4, arranged to contact the work material W when the work material is struck. The shoulder 38 of the tool housing is in this example arranged to extend over a surface of the foot portion 40 facing away from the work material W.

Preferably, the elastic arrangement 32 comprises a second elastic element 32" arranged between the tool housing 34 and a surface 42 of the impact head and tool combination 4 facing towards the work material W. The impact head and tool combination 4 may be arranged in restrained engagement between the elastic elements 32', 32". Preferably, the first elastic element 32' is provided with a lower hardness than the second elastic element 32".

The elastic elements 32', 32" may be in any suitable material, for example polyurethane, or rubber. The material may be elastic. The material may have a dampening quality. The material may be suitable to dissipate the kinetic energy of the impact head and tool combination 4. Alternatively, the elastic elements 32', 32" may be provided as damping springs. In this example, the elastic elements are provided as elongated strips 32', 32". The strips 32', 32" have a rectangular cross-section. The strips are partially fitted in a respective groove of the tool housing. Alternatively, or in addition, the strips could be partially fitted in a respective groove in the foot portion 40. The strips are 32', 32" laterally positioned externally of a working surface S of the impact head and tool combination 4. As seen in the direction of the strike D, the strips 32', 32" surround the working surface S. Alternatively, one of, or each of, the elastic elements 32', 32" may be provided a plurality of separated elements.

The material of the first elastic element may be elastic. The material may have a dampening quality. The material may be suitable to dissipate the kinetic energy of the impact head and tool combination 4. The dimensions, and the material, of the first elastic element, are preferably adapted to avoid excessive heat generation due to the dissipation of kinetic energy of the impact head and tool combination.

The material of the second elastic element may be elastic. The material may further have a dampening quality. The dimensions, and the material, of the second elastic element, are preferably adapted to avoid excessive heat generation during its deformation in the striking process.

In the embodiment shown in FIGS. 1 and 2, the impact head and tool combination 4 comprises the tool 4' to strike the work material W. The impact head and tool combination 4 further comprises the impact head 4" to receive a strike from the moving drive unit 2.

Preferably, the impact head 4" and the tool 4' comprises a respective collar 50, 52 at an interface between the impact head 4" and the tool 4', the collar 52 of the tool 4' surrounding, as seen in the direction of the stroke D, the working surface S of the tool which is arranged to come into contact with the work material W at the stroke. Said collars 50, 52 may thereby form said foot portion 40. Both collars 50, 52 may extend into a recess 44 of the tool housing 34 formed by the shoulder 38. Said elastic elements 32', 32" are preferably provided within the recess 44. The recess 44 is laterally positioned externally of the working surface S of the impact head and tool combination 4. As seen in the direction of the strike D, the recess 44 surrounds the working surface S.

The collar 50 of the impact head 4" may be arranged to be in contact with the first elastic element 32'. The collar 52 of the tool 4' may be arranged to be in contact with the second elastic element 32".

At a strike, the impact head and tool combination 4 moves towards the work material W, and thereby it compresses the second elastic element 32". When the work material W has been struck, elastic energy in the second elastic element 32" moves the impact head and tool combination 4 away from the work material W. Thereby, the first elastic element 32' dampens the movement of the impact head and tool combination 4, as it moves away from the work material W. Thereby, a closely controlled reciprocating movement of the impact head and tool combination 4 at a strike is accomplished.

The impact head 4" extends in the direction of the stroke D from an impact end 46 to a base region 48, where the base region 48 is closer to the tool 4' than the impact end 46. The impact head 4" is arranged so that the impact end 46 has laterally, in relation to the direction of the stroke D, a smaller extension than the base region 48. The base region 48 is in this example not at the interface of the impact head 4" with the tool 4'. The base region is at a distance from this interface. The base region 48 is indicated with a broken line in FIG. 2.

As suggested, the impact head 4" and the tool 4' may be mounted to the frame 30 and may be arranged to be movable in relation to the tool housing 34 of the frame 30. Preferably, the apparatus is arranged so as for perimeter edges of the base region 48 of the impact head 4" to, in the stroke direction D, substantially coincide with, perimeter edges of the working surface S of the tool 4' which is arranged to come into contact with the work material W at the stroke. Suitably, the impact head 4" narrows off in the direction away DA from the tool 4'. The apparatus in this example is arranged so as for the impact head 4" to transfer kinetic energy, from a stroke of the plunger 2 to the impact head 4", directly to the entire working surface S. A first portion 54 the impact head 4", between the impact end and the base region 48, is tapered in a direction away DA from the tool 4'. The apparatus is arranged so as for the impact head 4" to spread kinetic energy directly over the working surface S from the impact end 46.

As suggested, the impact head 4" and the tool 4' in this example comprise a respective collar 50, 52 at an interface between the impact head 4" and the tool 4'. The collar 52 of the tool 4' surrounds, as seen in the direction of the stroke D, the working surface S of the tool which is arranged to come into contact with the work material W at the stroke. The first portion 54 of the impact head 4" extends from the collar 50 of the impact head 4", to the impact end 46 of the impact head. The first portion 54 presents a perimeter edge at the collar 50, i.e. at the base region 48, which, as seen in the direction of the stroke D, substantially coincides with the working surface S. The first portion 54 may be arranged so that the first portion 54 has laterally, in relation to the direction of the stroke D, a smaller extension at the strike end 46 than at the impact head collar 50. As suggested, the collars 50, 52 are in this example arranged in the recess 44 of the tool housing 34. Thereby the elastic elements 32', 32" may be separated from, and not "interfere" with, the direct transfer of kinetic energy from the impact end 46 to the working surface S.

In use, the drive unit is moved so as to strike the impact head, thereby providing kinetic energy to the impact head and the tool. Thereby, the impact head 4" may transfer kinetic energy towards the center as well as the perimeter edges of the tool. The tool, thus provided with kinetic energy, is allowed to strike the work material W, so as to form the work material. Thereupon, a return movement of the movable impact head and tool combination 4, away from the work material, is enabled or assisted by a spring action of the second elastic element 32". Further, the return movement of the movable impact head and tool combination 4, is dampened by the first elastic element 32'.

Preferably, the drive unit 2, in this example the plunger, moves, upon the impact with the impact head, away from the work material. Thus, the drive unit 2 may be arranged to move, upon the impact with the impact head, away from the work material. The drive unit 2 may be arranged to bounce, upon the impact with the impact head. The movement of the drive unit 2, upon the impact with the impact head, may be secured by an appropriate selection of the mass of the drive unit, the mass of the impact head and tool combination. The movement of the drive unit 2, upon the impact with the impact head, may be further secured by an appropriate selection of the driving force, e.g. the hydraulic force, on the dive unit, at the time of impact with the impact head.

The movement of the drive unit away from the work material, upon the impact with the impact head, provides for avoiding that the impact head and tool combination contacts the drive unit during the return movement of the impact head and tool combination.

As understood from FIG. 2, the impact head 4" is, in a plane perpendicular to the direction D of the stroke of the drive unit, surrounded by the frame 30. As indicated with the arrow LD in FIG. 3, there is a lateral distance between the impact head 4" and the frame 30. More specifically, where the impact head 4" is, as seen in the stroke direction D, positioned centrally in relation to the frame 30, there is in said plane a distance between the impact head and the frame. Said distance LD may be 0.1-3.0 mm.

Figure 4:
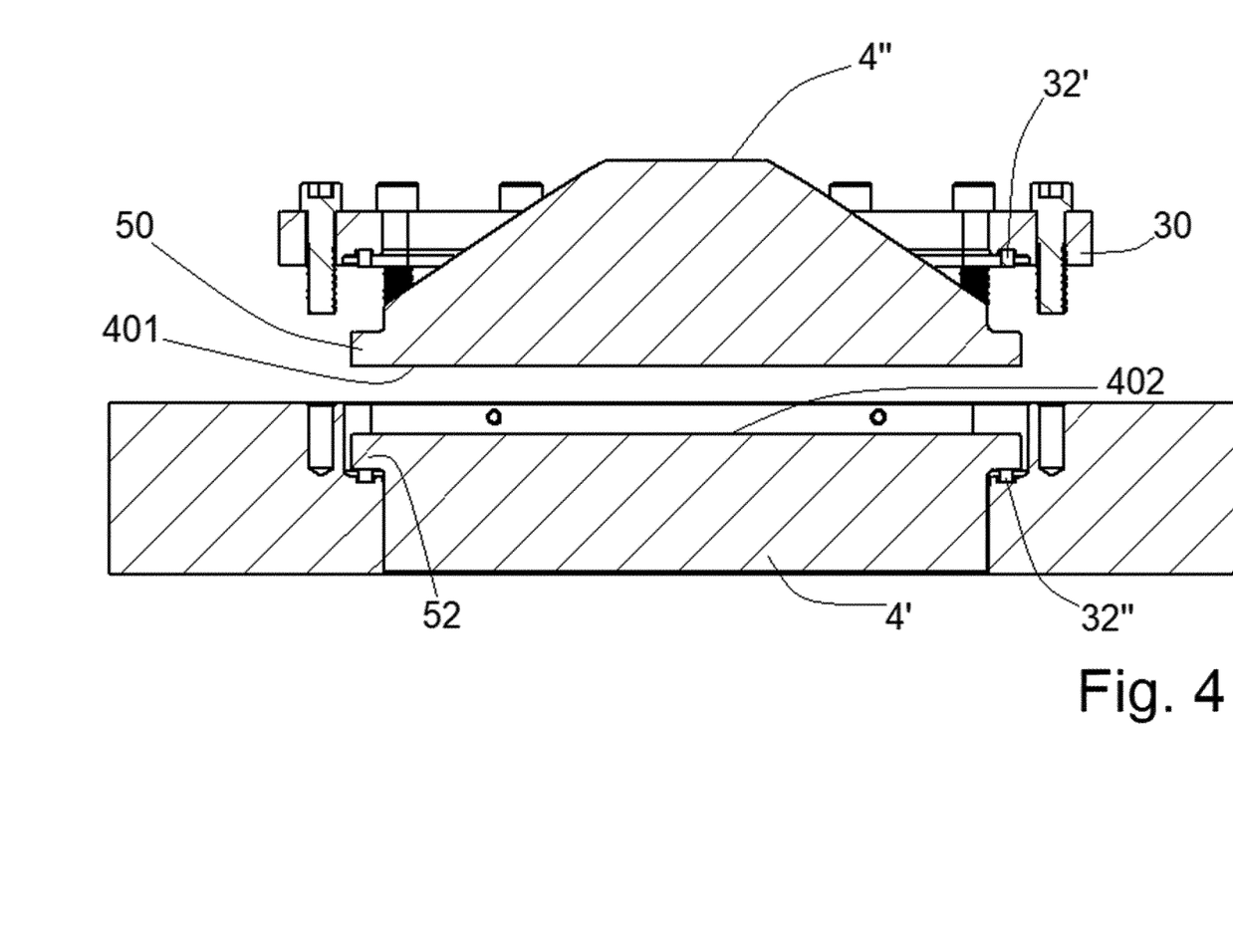
FIG. 4 shows the cross-section in FIG. 2 with parts vertically separated.

Reference is made also to FIG. 4, showing the impact head 4" and the tool 4' separated vertically. Respective surfaces 401, 402 of the impact head 4" and the tool 4', arranged to be in contact with the other of the impact head and the tool, are planar and perpendicular to the direction of the stroke of the drive unit. As suggested the collars 50, 52 are arranged to be restrained between the elastic elements 32', 32".

Thereby, the impact head 4" is arranged to be allowed to move, in relation to the tool 4', perpendicularly to the direction of the stroke of the drive unit. Thereby, the impact head is arranged to expand, laterally to a direction of the stroke of the drive unit, in relation to the tool.

Movements by the impact head 4", laterally to the direction of the stroke of the drive unit, are limited by the frame 30. Distances, laterally to the direction of the stroke of the drive unit, between the impact head 4" and the frame 30 are such that the impact head is allowed to move laterally to the stroke direction. Said allowed movement of the impact head 4" may be 0.2-6.0 mm.

Movements by the tool 4', laterally to the direction of the stroke of the drive unit, are limited by the frame 30. Distances laterally to the stroke direction between the impact head 4" and the frame, and distances laterally to the stroke direction between the tool 4' and the frame, may be such that the impact head is allowed to move laterally more than the tool. The frame is arranged to guide the tool 4' along the stroke direction. Distances laterally to the stroke direction between the tool 4' and the frame may be such that a tight fit is provided between the tool and the frame. The fit between the tool and the frame may allow the tool to move along the stroke direction, but may minimize lateral movements of the tool. It should be noted that the tool may tend to expand laterally when the drive unit strikes the impact head, and/or when the tool strikes the work material. Thereby, a friction between the tool and the frame may serve to somewhat brake the tool movement, albeit to an acceptable degree. It should also be noted that the frame may be allowed to expand laterally with the tool.

Figure 5:
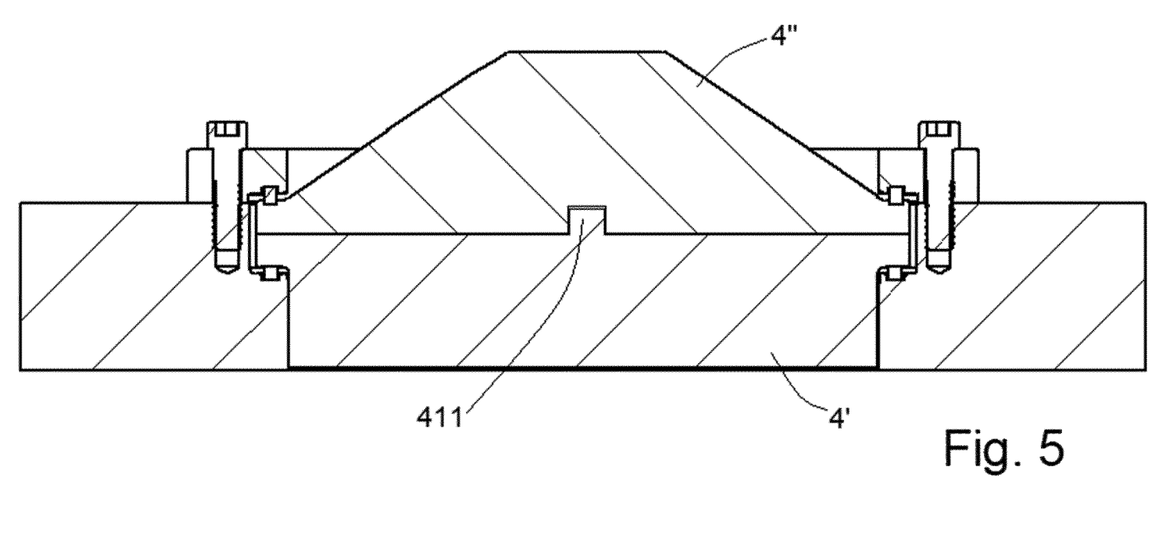
FIG. 5 shows a vertical cross-section a part of an apparatus for material forming according to another embodiment of the invention.

Reference is made to FIG. 5 showing a cross-section of parts in an apparatus according to another embodiment of the invention. In this embodiment, there is, centrally in the stroke direction, a lateral restriction 411 between the impact head 4" and the tool 4'. The lateral restriction is provided by a protrusion from one of the impact head and the tool, extending into a recess in the other of the impact head and the tool. Movements by the impact head 4", laterally to the direction of the stroke of the drive unit, are limited by the tool 4'.

Thereby, a peripheral region of the impact head 4" may be laterally unrestricted in relation to the tool 4'. Thereby, the peripheral region of the impact head may be allowed to move laterally in relation to the tool.

Figure 6:
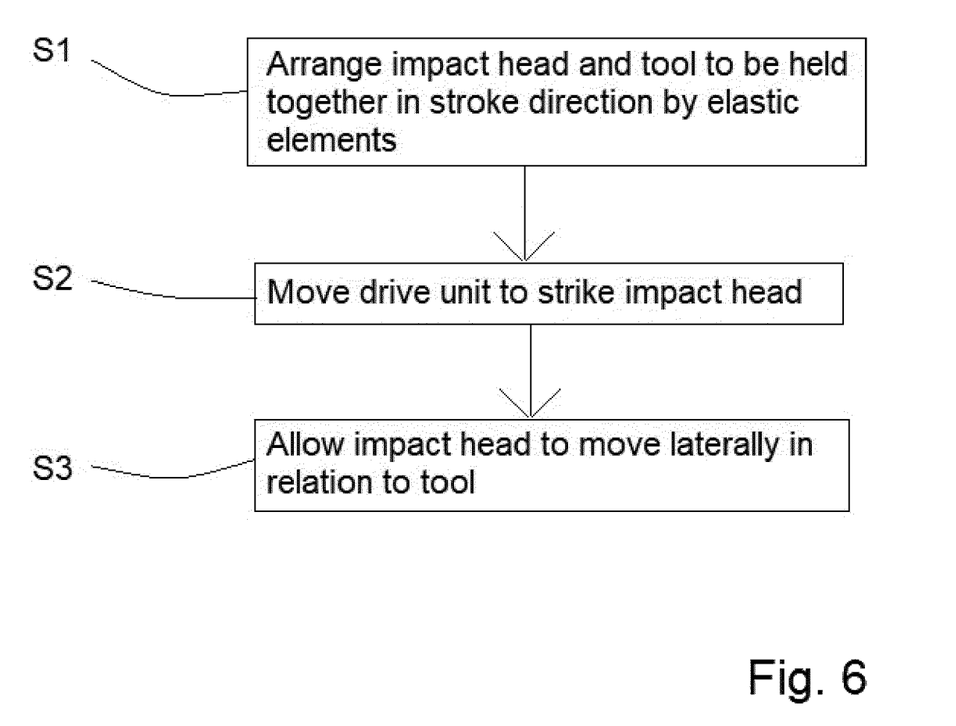
FIG. 6 is a flow diagram depicting steps in a method according to an embodiment of the invention.

With reference to FIG. 6, a method for material forming, with the use of an apparatus, e.g. according to the embodiment described with reference to FIG. 1-FIG. 4, will be described. Thus, the apparatus comprises, a drive unit in the form of a plunger 2 arranged in a cylinder housing 1. The apparatus also comprises an impact head 4", and a tool 4' arranged in a frame 30 which is fixed to the cylinder housing 1.

The method comprises arranging S1 the impact head 4" and the tool 4' so as to be held together in the frame 30, in the direction of the stroke of the drive unit 2, by first and second elastic elements 32", 32". Thereafter, the drive unit 2 is moved S2 to strike the impact head 4". Thereby, the impact head 4" is allowed S3 to move laterally in relation to the tool 4'.

It is to be understood that the present invention is not limited to the embodiments described above and illustrated in the drawings; rather, the skilled person will recognize that many changes and modifications may be made within the scope of the appended claims.

The invention claimed is:

1. An apparatus for material forming, by means of a tool (4') and a drive unit, the apparatus being arranged to move the drive unit to provide kinetic energy to the tool, for the tool to strike a work material, so as to form the work material, the apparatus comprising an impact head between the drive unit and the tool, and the apparatus configured to provide the kinetic energy to the tool by the drive unit striking the impact head, wherein at least a peripheral region of the impact head is configured to move in relation to the tool laterally to a direction of the stroke of the drive unit, wherein the entire impact head is arranged to expand laterally in relation to the tool.

2. An apparatus according to claim 1, wherein the apparatus comprises a frame, the apparatus comprising one or more first elastic elements arranged between the frame and the impact head-so as to bias the impact head towards the work material, wherein the apparatus comprises one or more second elastic elements arranged between the frame and the tool so as to bias the tool away from the work material.

3. An apparatus according to claim 2, wherein the impact head and the tool are held together, in the direction of the stroke of the drive unit, by the first and second elastic elements.

4. An apparatus according to claim 1, wherein the apparatus comprises a frame, wherein the impact head and the tool comprise a respective collar at an interface between the impact head and the tool, wherein the collars are arranged in a recess of the frame.

5. An apparatus according to claim 4, wherein one or more first elastic elements are arranged between one or more surfaces of the impact head collar, facing away from the work material, and one or more surfaces in the recess, wherein one or more second elastic elements are arranged between one or more surfaces of the tool collar, facing away from the impact head, and one or more surfaces in the recess, wherein the collars are arranged to be restrained between the elastic elements.

6. An apparatus according to claim 1, wherein the apparatus comprises a frame, wherein the impact head is, in a plane perpendicular to the direction of the stroke of the drive unit, surrounded by the frame.

7. An apparatus according to claim 6, wherein, where the impact head is, as seen in the stroke direction, positioned centrally in relation to the frame, there is in said plane a distance between the impact head and the frame.

8. An apparatus according to claim 7, wherein said distance is 0.1-3.0 mm.

9. An apparatus according to claim 1, wherein the impact head is arranged to be allowed to move, in relation to the tool, perpendicularly to the direction of the stroke of the drive unit.

10. An apparatus according to claim 1, wherein any respective surface of the impact head and the tool, arranged to be in contact with the other of the impact head and the tool, are planar and perpendicular to the direction of the stroke of the drive unit.

11. An apparatus according to claim 1, wherein the apparatus comprises a frame, wherein movements by the impact head, laterally to the direction of the stroke of the drive unit, are limited by the frame.

12. An apparatus according to claim 11, wherein distances, laterally to the direction of the stroke of the drive unit, between the impact head and the frame are such that the impact head is allowed to move laterally to the stroke direction.

13. An apparatus according to claim 12, wherein said allowed movement of the impact head is 0.2-6.0 mm.

14. An apparatus according to claim 1, wherein the apparatus comprises a frame, wherein movements by the tool, laterally to the direction of the stroke of the drive unit, are limited by the frame.

15. An apparatus according to claim 14, wherein the apparatus comprises a frame, wherein movements by the impact head, laterally to the direction of the stroke of the drive unit, are limited by the frame, wherein distances laterally to the stroke direction between the impact head and the frame, and distances laterally to the stroke direction between the tool and the frame, are such that the impact head is allowed to move laterally more than the tool.

16. An apparatus according to claim 14, wherein the frame is arranged to guide the tool along the stroke direction.

17. A method for material forming, by means of a tool and a drive unit, the method comprising moving the drive unit to provide kinetic energy to the tool, for the tool to strike a work material, so as to form the work material, wherein the kinetic energy is provided to the tool by the drive unit striking an impact head between the drive unit and the tool, wherein upon the strike of the impact head by the drive unit, at least a peripheral region of the impact head is configured to move in relation to the tool laterally to a direction of the stroke of the drive unit, whereby the entire impact head is allowed to expand laterally in relation to the tool.

18. A method according to claim 17, comprising arranging the impact head and the tool to be held together, in the direction of the stroke of the drive unit, by one or more first elastic elements arranged between a frame and the impact head, and by one or more second elastic elements arranged between the frame and the tool.

19. A method according to claim 17, comprising allowing, upon the strike of the impact head by the drive unit, the impact head to move, in relation to the tool, perpendicularly to the direction of the stroke of the drive unit.

* * * * *